Patented Mar. 6, 1923.

1,447,938

UNITED STATES PATENT OFFICE.

CARLETON ELLIS AND VERNON T. STEWART, OF MONTCLAIR, NEW JERSEY.

PROCESS OF MAKING ARSENATE OF LIME.

No Drawing.  Application filed December 19, 1921. Serial No. 523,563.

*To all whom it may concern:*

Be it known that we, CARLETON ELLIS and VERNON T. STEWART, citizens of the United States, and residents of Montclair, in the county of Essex and State of New Jersey, have invented certain new and useful Improvements in Processes of Making Arsenate of Lime, of which the following is a specification.

This invention relates to a process of making calcium arsenate or as it is generally hereinafter termed "arsenate of lime" inasmuch as it is not pretended that the product is chemically pure, and relates especially to a simplified procedure of manufacture which enables the product to be made in a cheap and efficient manner.

Heretofore it has been customary to prepare arsenate of lime by the so-called wet process involving precipitation in highly dilute solutions and consequently involving operations handling a great bulk of material. Aside from the trouble and expense of carrying out the process in this manner there is the additional item of depreciation on a plant operating by the wet method.

Arsenate of lime has been found the most satisfactory insecticide with which to combat the ravages of the boll weevil in the cotton fields. However in order to produce arsenate of lime to meet the requirements of the cotton grower it is important to have available a method which will enable the arsenate to be prepared cheaply and rapidly in large quantities in order that the seasonal demand for the insecticide may be readily met. Methods looking to the production of arsenate of lime without the employment of a large bulk of water in precipitation have been considered and proposals have been made for treating lime stone with arsenic acid and also treating a paste of slaked lime with this acid. So far as we are advised these methods are impracticable for various reasons. The content of soluble arsenic is such that the material could hardly be expected to serve as an insecticide. The presence of water soluble arsenic in any substantial amount is ruinous to vegetation. Dry methods of preparation are therefore so far as we are advised generally considered wholly unfeasible.

In accordance with the present invention we have found it possible to carry out a process of dry slaking quicklime with arsenic acid containing a certain proportion of water in a manner which yields a product surprisingly low in water soluble arsenic and which likewise apparently conforms to the legal and commercial requirements for arsenate of lime. Arsenate of lime is required by law (in some localities) to contain at least 40% arsenic pentoxide substantially in the combined form. It should not contain in excess of 0.75% water soluble arsenic calculated as the pentoxide. The product must be voluminous powder of such bulk that one pound will occupy a space of from 80 to 100 cubic inches. The commercial requirements are that the product should be relatively cheap and hence should be capable of manufacture on the large scale without the employment of skilled labor in undue amount. Generally a product is desired which is white in color in preference to products which are brownish in color or off color, although the intrinsic merit of the insecticide is generally not impaired by color variations as these are not usually based on any chemical alteration.

We have found it possible to meet these legal and commercial requirements through the dry slaking process which will be hereinafter set forth and which in some respects at least has derivation in our copending application Serial 431,348, filed December 17, 1920.

Our investigations have shown that when an aqueous solution of arsenic acid is added to quick lime which is in a coarse lumpy form action takes place at the surface with the formation of what appears to be the dicalcium arsenate, while a comparatively small proportion is transformed into the desired tricalcium arsenate. On the other hand if the quick lime is ground to a fine granular condition or even better to a fine pulverulent state and arsenic acid suitably proportioned and containing a predetermined amount of water is added thereto, violent reaction takes place with the formation of a very substantial and entirely satisfactory proportion of tricalcium arsenate. The more complete conversion to the desired tricalcium compound apparently also is effected by agitation and we preferably employ mechanical agitators in the receptacles employed for carrying out the reaction. The addition of the arsenic acid solution gradually to the powdered quick lime also is advantageous because it allows action on the surface of the particles to take place in the presence of an excess of lime and as the surface of each particle becomes coated with the arsenate, the heat of reaction and agitation serve constantly to expose fresh surfaces of the particles and thus advantageously keep the quick lime in excess. By this comparatively simple procedure we are able to overcome the obstacles heretofore in the path of those attempting to produce a product of this description in a cheap and simple manner. The lime employed in the present invention is preferably what is known as high calcium lime in contradistinction to the dolomitic or high magnesium limes. While it is possible to use dolomitic or magnesium lime for the purpose it is generally better to use lime produced from the high calcuim lime stone. We regard the heat of slaking as having a distinctly favorable influence on the reaction and by employing the joint agencies of heat developed by slaking and heat developed by the union of arsenic acid with lime, conditions obtain which lead to a highly complete conversion to tricalcium arsenate.

The strength of solution of arsenic acid employed may be varied somewhat to meet different requirements in grades of lime and other conditions but preferably we employ the solution in quite a concentrated form. For example 75% strength of acid is a heavy viscous liquid of a specific gravity about 1.88. An acid of this strength furnishes enough water for the desired degree of hydration advantageous for opening the lime particles and permitting the ingress and reaction of the arsenic acid. Acid of 75% strength is furthermore a convenient form to handle and store. While as stated the acid of this strength is a suitable one, it should be understood we do not limit ourselves to acid of precisely this strength but may use weaker or stronger acid according to the nature of the qucik lime employed, the size of the vessel employed for slaking and other conditions. Thus an acid having a strength between 50 and 75% may be employed with limes of high calcium content and between 75 and 90% with limes of lower calcium content in some cases so that we do not wish to lay down any hard and fast rule with respect to the precise concentration of the arsenic acid, it preferably being of such strength that when added gradually to the powdered quick lime the formation of moist or putty-like masses does not occur. This regulation of the slaking and reaction is controlled not only by the proportion of water present but by the rate of addition of the arsenic acid solution. It is furthermore desirable to have the finished product in a dry pulverulent condition hence the addition of arsenic acid which is too much diluted would yield a moist product which could not be packaged satisfactorily nor would it be likely to spread over vegetation in the form of a fine dust in the same manner as would be obtainable by our product when slaked under preferred conditions.

In fact with high calcium lime in a finely ground state and arsenic acid of 75% strength the reaction is so violent that the mass of quick lime becomes a seething boiling body which acts more like a liquid than a solid in view of the buoyant effect of the steam disengaged during the reaction.

This condition as indicated affords a bulky voluminous product corresponding very favorably in legal bulk requirement to products made by the more expensive method of wet precipitation.

As noted, mechanical agitation preferably should be employed and this preferably should be vigorous in order to constantly bring fresh particles of the quick lime material into contact with the spray or incoming stream of arsenic acid solution. Owing to the amount of dust produced in the operation it is best that the reaction be carried out in a closed vessel or one fitted with dust collectors. The process may be an intermittent one, that is a batch process, or it may be carried out in a continuous or non-cumulative manner as for example by feeding a stream of crushed quick lime along a conveyor and adding a stream of arsenic acid solution in the proper combining proportions.

After the reaction is completed the product may be suitably screened or ground if desired and preferably is passed through an air separator where by air flotation any coarse, gritty particles, silica and other foreign substances originally present in the lime stone or any unburned lime "cores" and the like are removed. In this connection we recommend the quick lime employed be well burned in order to as completely as possible eliminate cores. Calcium carbonate (i. g. unburned limestone, etc.) is prone to form the mono- or di-calcium arsenate and therefore is undesirable except in such small quantities as must necessarily be present under good conditions of operation. On the other hand we do not wish to limit ourselves to lime stone which is substantially free from unburnt lime or calcium carbonate. The heat of reaction coupled with the agitation is such that even any carbonate if present in small amounts may be expected to react to better advantage than when lime stone is being treated with arsenic acid solution under ordinary conditions. While therefore our process permits of the presence of some carbonate with considerable safety, we nevertheless recommend the employment of a well-burnt quick lime in the preferred operation.

The arsenic acid employed preferably is quite free from arsenious oxide as the latter will form products dangerous to vegetation. The arsenic acid used may be made by any suitable method, as for example by oxidation of white arsenic with nitric acid or a process described in our copending applications according to which arsenious oxide or arsenious acid is treated with chlorine.

As has already been noted the preferred form of the invention contemplates the use of finely ground or crushed quick lime. We have secured excellent results with quick lime passing a sieve of 80 meshes per inch. No beneficial results apparently will be obtained by using lime of any higher degree of fineness although there is no objection to such use. On the other hand the lime may be considerably coarser than 80 mesh but preferably we make use of particles crushed to a size finer than wheat. We may note however at this point that we believe there is a relation between the size of the particles of quick lime, the rate of addition of the arsenic acid and the degree of agitation. If the fragments of quick lime are quite coarse, as for example substantially coarser than wheat an especially vigorous agitation is recommended with relatively slow addition of the arsenic acid solution so that an excess of lime is present and time is permitted for the reaction at the surfaces of the fragments to progress completely before they come into contact with an additional amount of arsenic acid. The finer the particles the greater the surface of exposure and consequently the less danger there is of an undue amount of arsenic acid bringing about localized conditions resulting in the formation of soluble arsenical compounds. On the other hand with the coarser fragments the area of surface available for reaction is substantially reduced and this condition should be given consideration in carrying out the process where it is desired to maintain a high standard for the product. We recommend therefore that the quick lime be ground so that it will pass a screen of 8 or 10 mesh and upwards.

As an illustration of the method embraced under the present invention the following will serve.

5 parts by weight of quick lime practically free from magnesium compounds and ground to 80 mesh were placed in a receptacle and approximately 6 parts by weight of arsenic acid of 75% strength was slowly added to the pulverized quick lime while the material was constantly stirred. The reaction was violent. The product was allowed to cool and was found to be a white bulky powder. The content of arsenic pentoxide was found by analysis to be 42%. The amount of water soluble arsenic as arsenic pentoxide was 0.22%. Thus the product had in excess of the 40% arsenic pentoxide required by law and also had a content of soluble arsenic very materially below the maximum percentage legally allowed. In another case the same proportions of quick lime and arsenic acid were employed but the solution of the latter was first heated to boiling. The vigor of the reaction was even more pronounced and the resulting product showed a content of 42.8% arsenic pentoxide and soluble arsenic as pentoxide 0.3%.

The preferred form of product has as primary components tricalcium arsenate and calcium hydrate. Steam is evolved during the reaction when using the proportions noted in the example, there also may be some dust loss as was the case in the example noted. This appears to affect the calcium more than the arsenic content, thus the content of arsenic pentoxide found by analysis according to the example is slightly higher than the calculated percentages when making no allowance for such losses.

The product is preferably air-separated to remove the coarser particles.

If additions of other substances are required these substances may be introduced into the lime or the acid or into the finished product, which ever is more appropriate. Thus, dextrine to afford better adhesion, calcium stearate to make the product somewhat less affected by water and other organic or mineral substances may be introduced according to any special requirement.

What we claim is:

1. The process of making arsenate of lime which comprises gradually adding concentrated aqueous arsenic acid to powdered quick lime of high calcium content in a state of agitation, the proportion of water present in the arsenic acid being sufficient only to yield a pulverulent product.

2. The process of making arsenate of lime which comprises gradually adding concentrated aqueous arsenic acid to powdered quick lime in a state of agitation, the proportion of water present in the arsenic acid being only sufficient to yield a pulverulent product.

3. The process of making arsenate of lime which comprises gradually adding concentrated aqueous arsenic acid to powdered quick lime of high calcium content in a state of agitation the proportion of water present in the arsenic acid being only sufficient to yield a pulverulent product and the proportion of arsenic acid being sufficient to form an arsenate containing at least 40% of combined arsenic pentoxide.

4. The process of making arsenate of lime which comprises mechanically agitating a body of finely crushed high calcium quick lime and gradually adding thereto a solution of arsenic acid containing water to render it of approximately 75 per cent strength thereby furnishing water to expand and react with the quick lime, permitting the agitation to continue during the addition of the arsenic acid solution whereby substantially complete combination of the latter with the lime to form arsenate of lime substantially free from water-soluble arsenical compounds occurs.

5. The process of making arsenate of lime which comprises mechanically agitating a body of finely crushed high calcium quick lime and gradually adding thereto a solution of arsenic acid containing water to render it of approximately 75 per cent strength thereby furnishing water to expand and react with the quick lime, permitting the agitation to continue during the addition of the arsenic acid solution whereby substantially complete combination of the latter with the lime to form arsenate of lime substantially free from water-soluble arsenical compounds occurs and containing at least 40% of combined pentoxide.

6. The process of making arsenate of lime which comprises mechanically agitating a body of finely crushed high calcium quick lime and gradually adding thereto a concentrated aqueous solution of arsenic acid thereby furnishing water to expand and react with the quick lime, permitting the agitation to continue during the addition of the arsenic acid solution whereby substantially complete combination of the latter with the lime occurs to form arsenate of lime containing less than 0.75% of water-soluble arsenical compounds and at least 40% of combined arsenic pentoxide.

7. The process for the manufacture of calcium arsenate which comprises adding a concentrated solution of arsenic acid containing water to an excess of pulverized quick lime with agitation and regulating the addition of the acid solution to maintain the mass largely in a non-pasty pulverulent condition during the reaction.

8. A process which comprises slowly adding concentrated arsenic acid solution to finely ground quick lime, while thoroughly agitating the mass, the proportion of water being such as to yield a pulverulent product.

9. A process which comprises slowly adding concentrated arsenic acid solution to finely ground quick lime, while thoroughly agitating the mass, the proportion of water being such as to yield a pulverulent product, the rate of addition of the arsenic acid solution being so adjusted as to avoid the formation of a mass of putty-like consistency at any stage of the process.

CARLETON ELLIS.
VERNON T. STEWART.